United States Patent
Nicol

[19]

[11] Patent Number: 5,635,561
[45] Date of Patent: Jun. 3, 1997

[54] STAR BLOCK COPOLYMER OF VINYLAROMATIC MONOMER AND OF CONJUGATED DIENE PROCESS FOR PREPARING IT, AND ITS COMPOSITIONS WITH CRYSTAL POLYSTYRENE

[75] Inventor: Pascal Nicol, Pau, France

[73] Assignee: Elf Atochem S. A., Puteaux, France

[21] Appl. No.: 610,682

[22] Filed: Mar. 4, 1996

Related U.S. Application Data

[62] Division of Ser. No. 358,218, Dec. 16, 1994, Pat. No. 5,539,058.

[30] Foreign Application Priority Data

Dec. 29, 1993 [FR] France ................... 93 15829

[51] Int. Cl.⁶ ..................................... C08F 297/04
[52] U.S. Cl. ............................... 525/98; 525/314
[58] Field of Search ........................ 525/314, 98

[56] References Cited

U.S. PATENT DOCUMENTS

| | | | |
|---|---|---|---|
| 4,704,434 | 11/1987 | Kitchen | 525/250 |
| 4,925,899 | 5/1990 | Rendina | 525/314 |
| 5,130,377 | 7/1992 | Trepka | 525/314 |
| 5,256,736 | 10/1993 | Trepka | 525/314 |
| 5,290,875 | 3/1994 | Moczygemba | 525/314 |
| 5,319,033 | 6/1994 | Trepka | 525/314 |
| 5,399,628 | 3/1995 | Moczygemba | 525/314 |

*Primary Examiner*—Irina S. Zemel
*Attorney, Agent, or Firm*—Pennie & Edmonds

[57] ABSTRACT

The invention relates to a star block copolymer of the formula $[S_1-S_2-(B_1/S_3)-B_2]_m-X-[B_2(B_1/S_3)-S_2]_n$ in which X represents a polyfunctional radical resulting from a coupling agent, m and n represent non-zero integers such that m+n is equal to 3 or 4, $S_1$ and $S_2$ each represent a block of a polymer containing at least one vinylaromatic monomer, $B_2$ represents a block of a polymer containing at least one conjugated diene, $(B_1/S_3)$ represents a block of a statistical copolymer containing at least one vinylaromatic monomer and at least one conjugated diene, 40 to 75% by weight of $(B_1/S_3)$ consisting of resulting from vinylaromatic monomer, characterized in that the sum of the mass of the blocks $B_2$ contains more than 40% by weight and less than 90% by weight of the total mass of the conjugated diene contained in the said star block copolymer. The invention also relates to the process for obtaining this copolymer. The compositions comprising this copolymer and crystal polystyrene have noteworthy mechanical properties and transparencies.

10 Claims, No Drawings

STAR BLOCK COPOLYMER OF VINYLAROMATIC MONOMER AND OF CONJUGATED DIENE PROCESS FOR PREPARING IT, AND ITS COMPOSITIONS WITH CRYSTAL POLYSTYRENE

This is a division, of application Ser. No. 08/358,218, filed Dec. 16, 1994 U.S. Pat. No. 5,539,058.

FIELD OF THE INVENTION

The present invention relates to a new star block copolymer of a vinylaromatic monomer and of a conjugated diene and to the process for obtaining it. The compositions comprising this copolymer and crystal polystyrene have noteworthy mechanical and transparency properties.

BACKGROUND OF THE INVENTION

Document EP 270,515 describes linear copolymers of general formula $S_1$-$B_1$-$B_2$/$S_2$-$S_3$ containing from 60 to 95% of vinylaromatic compound and from 5 to 40% of diene. In the formula, $S_1$ and $S_3$ are vinylaromatic polymer blocks, $B_1$ is a polydiene block and $B_2$/$S_2$ is a statistical block copolymer of conjugated diene and of vinylaromatic monomers. This copolymer has satisfactory mechanical properties but its optical properties are relatively mediocre since the haze index for the pure resin scarcely falls below 6.7 whereas it scarcely falls below 13.5 when it is mixed with crystal polystyrene.

Document U.S. Pat. No. 4,221,884 describes bimodal star block copolymers, which are particularly resilient at low temperatures, of general formula $(S_1$-$S_2/B_1$-$B_2)_m$-X-$(B_2S_2/B_1)_n$. In this formula, $S_1$ is a non-elastomeric block, $S_2/B$ is a copolymer block of a vinylaromatic compound and of a conjugated diene. In this copolymer, the ratio by mass of $S_2$ to $B_1$ is less than 1. $B_2$ is a conjugated polydiene block containing 20 to 40% by weight of all the conjugated diene contained in the star block copolymer. These copolymers have mediocre transparencies and are difficult to mix with crystal polystyrene.

Document U.S. Pat. No. 4,925,899 describes bimodal star block copolymers containing from 60 to 90% by weight of a vinylaromatic monomer and from 40 to 10% by weight of a conjugated diene. This copolymer is represented by the general formula $(S_1$-$S_2$-$B_1/S_3$-$B_2)_m$-X-$(B_2$-$S_3/B_1$-$S_2)_n$ in which $S_1$ and $S_2$ are vinylaromatic polymer blocks, $B_2$ is a conjugated polydiene block containing up to 20% of all the diene units of the copolymer and $B_1/S_3$ and $S_3/B_1$ are copolymer blocks of a vinylaromatic monomer and of a conjugated diene, the said copolymer blocks consisting of diene $B_1$ and of vinylaromatic monomer $S_3$ with a $B_1$:$S_3$ ratio by mass of between 0.8 and 1.2 resulting from vinylaromatic monomer. However, these copolymers have such high melt indices that it is difficult to envisage mixing them with crystal polystyrene.

SUMMARY OF THE INVENTION

A new star block copolymer has now been found of general formula $[S_1$-$S_2$-$(B_1/S_3)$-$B_2]_m$-X-$[B_2$-$(B_1/S_3)$-$S_2]_n$ in which X represents a polyfunctional radical resulting from a coupling agent, m and n represent non-zero integers such that m+n is equal to 3 or 4 and is also equal to the degree of functionality of the radical X, $S_1$ and $S_2$ each represent a block of a polymer containing at least one vinylaromatic monomer, $B_2$ represents a block of a polymer containing at least one conjugated diene, $(B_1/S_3)$ represents a block of a statistical copolymer containing at least one vinylaromatic monomer and at least one conjugated diene, with 40 to 75% by weight of $(B_1/S_3)$ consisting of units resulting from vinylaromatic monomer(s). The sum of the mass of the blocks $B_2$ contains more than 40% by weight and less than 90% by weight of the total mass of conjugated diene contained in the star block copolymer according to the invention. The copolymer of the present invention has a noteworthy transparency.

Another aspect of the present invention is a process for the manufacture of the star block copolymer described above. The process according to the invention comprises a sequence of stages. In a first stage, intended to form the blocks $S_1$, a first amount of vinylaromatic monomer is anionically polymerized in the presence of a catalyst, generally an organolithium compound such as n-butyllithium. After virtually complete polymerization, a further amount of catalyst and of vinylaromatic monomer are added, in a second stage, so as to form the blocks $S_2$ which are partly bonded to the blocks $S_1$. After virtually complete polymerization, blocks $S_1$-$S_2$ and blocks $S_2$ are therefore present in the polymerization medium. The third stage is then carried out by adding, to the medium, a mixture of vinylaromatic monomer and of conjugated diene, which will copolymerize to form blocks $(B_1/S_3)$ which are partly bonded to the blocks $S_2$ and partly bonded to the blocks $S_1$-$S_2$. After virtually complete copolymerization, the polymerization medium therefore contains blocks $S_1$-$S_2$-$(B_1/S_3)$ and blocks $(B_1/S_3)$-$S_2$. The fourth stage is then carried out by adding the amount of conjugated diene intended to form the blocks $B_2$, part of which bonds to the blocks $(B_1/S_3)$-$S_2$ to form blocks $B_2$-$(B_1/S_3)$-$S_2$ and the other part of which bonds to the blocks $S_1$-$S_2$- $(B_1/S_3)$ to form blocks $S_1$-$S_2$- $(B_1/S_3)$-$B_2$. After virtually complete polymerization, the fifth stage is carried out, which consists in adding a coupling agent to the medium in order to lead to a star block copolymer according to the present invention.

A further aspect of the present invention is a composition comprising the star block copolymer described above and crystal polystyrene. This composition also has a noteworthy transparency and, moreover, has an array of excellent mechanical properties. This composition combines high impact strength, high elongation at break, and high flexural modulus. The combination of these last two properties is particularly surprising because they are generally in conflict.

DESCRIPTION OF THE PREFERRED EMBODIMENTS

A new star block copolymer has now been found of general formula $[S_1$-$S_2$-$(B_1/S_3)$-$B_2]_m$-X-$[B_2$-$(B_1/S_3)$-$S_2]_n$ in which X represents a polyfunctional radical resulting from a coupling agent, m and n represent non-zero integers such that m+n is equal to 3 or 4 and is also equal to the degree of functionality of the radical X, $S_1$ and $S_2$ each represent a block of a polymer containing at least one vinylaromatic monomer, $B_2$ represents a block of a polymer containing at least one conjugated diene, $(B_1/S_3)$ represents a block of a statistical copolymer containing at least one vinylaromatic monomer and at least one conjugated diene, 40 to 75% by weight of $(B_1/S_3)$ consisting of units resulting from vinylaromatic monomer(s). The star block copolymer is preferably such that 45 to 70% by weight of $(B_1/S_3)$ consists of units resulting from vinylaromatic monomer(s). In a more preferred way, the star block copolymer is such that more than 50% by weight and less than 70% by weight of $(B_1/S_3)$ consists of units resulting from vinylaromatic monomer(s). The star block copolymer preferably contains from 20 to 30% by weight of units resulting from conjugated diene(s) ($B_1+B_2$). The sum of the mass of the blocks $B_2$ contains more than 40% by weight and less than 90% by weight of the total mass of conjugated diene contained in the star block copolymer according to the invention. The copolymer of the present invention has a noteworthy transparency.

Another subject of the present invention relates to a composition comprising the star block copolymer described above and crystal polystyrene. This composition also has a noteworthy transparency and, moreover, has an array of excellent mechanical properties. In fact, it could be observed that this composition combines, at the same time, a high impact strength, a high elongation at break and a high flexural modulus. The combination of these last two properties is particularly surprising because they are generally in conflict.

This composition preferably contains from 60 to 90% by weight of star block copolymer.

Another subject of the present invention relates to a process for the manufacture of the star block copolymer described above. In what follows, the expression virtually complete polymerization or virtually complete copolymerization means that more than 99% by weight of the monomers introduced are polymerized. The process according to the invention comprises a sequence of stages. In a first stage, intended to form the blocks $S_1$, a first amount of vinylaromatic monomer is anionically polymerized in the presence of a catalyst, generally an organolithium compound such as n-butyllithium. After virtually complete polymerization, a further amount of catalyst and of vinylaromatic monomer are added, in a second stage, so as to form the blocks $S_2$ which are partly bonded to the blocks $S_1$. After virtually complete polymerization, blocks $S_1$-$S_2$ and blocks $S_2$ are therefore present in the polymerization medium. The third stage is then carried out by adding, to the medium, a mixture of vinylaromatic monomer and of conjugated diane, which will copolymerize to form blocks ($B_1/S_3$) which are partly bonded to the blocks $S_2$ and partly bonded to the blocks $S_1$-$S_2$. After virtually complete copolymerization, the polymerization medium therefore contains blocks $S_1$-$S_2$-($B_1/S_3$) and blocks ($B_1/S_3$)-$S_2$. The fourth stage is then carried out by adding the amount of conjugated diane intended to form the blocks $B_2$, part of which bonds to the blocks ($B_1/S_3$)-$S_2$ to form blocks $B_2$-($B_1/S_3$)-$S_2$ and the other part of which bonds to the blocks $S_1$-$S_2$-($B_1/S_3$) to form blocks $S_1$-$S_2$-($B_1/S_3$)-$B_2$. After virtually complete polymerization, the fifth stage is carried out, which consists in adding a coupling agent to the medium in order to lead to a star block copolymer according to the present invention.

It is then advisable to deactivate, via an electrophilic agent, the ionic species resulting from the coupling. In order to do this, the polymerization medium could be reacted first of all with carbon dioxide gas, by applying a pressure of approximately three bars of this gas, and then, after returning to atmospheric pressure, water will be injected in a proportion of approximately one mole of water per mole of catalyst introduced into the medium.

The solvent is then removed by any suitable technique, for example by using a hot evaporator under vacuum.

Each of these stages requires techniques known in their principle by those skilled in the art, their novel arrangement leading to the star block copolymers of the present invention.

The amounts of vinylaromatic monomer and of conjugated diene to be brought into play for each polymerization stage are to be chosen as a function of the composition desired for the star block copolymer to be synthesized, taking into account that each polymerization stage can and must be forced as far as virtually complete polymerization of the monomers introduced.

Generally, the introduction takes place, during the first, second and third stages, of 45 to 55% by weight, of 30 to 40% by weight and of 5 to 15% by weight respectively of all the vinylaromatic monomer necessary for the synthesis of the copolymer. Moreover, the introduction generally takes place, during the third and fourth stages, of between 10 and 60% by weight and of between 90 and 40% by weight respectively of all the conjugated diene necessary for the synthesis of the copolymer.

It is possible to use, as catalyst, organic derivatives of lithium such as ethyllithium, propyllithium, butyllithium, amyllithium, hexyllithium, cyclohexyllithium, phenyllithium, tolyllithium, naphthyllithium and their isomers, in particular n-butyllithium and sec-butyllithium.

During the first and second stages, the catalyst is introduced in a proportion of 1 to 20 millimole per mole of vinylaromatic monomer introduced during the same stage.

It is possible to use, as coupling agent, compounds comprising functional groups that can react with the lithium carbanion bonds and which make it possible to connect a functional group to a carbon chain.

It is possible to use either coupling agents which are capable of being trifunctional, that is to say capable of generating star block copolymers containing three branches so that m+n=3 in the general formula, or coupling agents which are capable of being tetrafunctional, that is to say capable of generating star block copolymers containing four branches so that m+n=4 in the general formula. Coupling agents capable of being tetrafunctional are also generally capable of being trifunctional if they are introduced in a suitable amount, taking into account the total amount of catalyst introduced into the polymerization medium, as shown below.

Examples of coupling agents capable of being trifunctional and not tetrafunctional are polybutadienes containing three epoxide functional groups, epoxidized soya oil or metal trihalides such as methyltrichlorosilane.

Examples of coupling agents capable of being tetrafunctional or trifunctional are polybutadienes containing four epoxide functional groups, metal tetrahalides such as $SiCl_4$, acid dihalides, or diesters of general formula $R^1OOC$—$(CH_2)_n$—$COOR^2$ in which $R^1$ and $R^2$, which can be identical or different, each represent an alkyl group comprising from 1 to 30 carbon atoms and n represents an integer ranging from 1 to 10.

The preferred coupling agents are the diesters whose formula has just been shown and for which R' and R 2 each represent an alkyl group containing from 8 to 30 carbon atoms.

If it is desired to produce a copolymer according to the invention containing three branches, that is to say for which m+n=3 in its general formula, it will be suitable to introduce 1 mole of coupling agent capable of being trifunctional per 3 moles of catalyst introduced in total into the polymerization medium. If it is desired to produce a copolymer according to the invention containing four branches, that is to say for which m+n=4 in its general formula, it will be suitable to introduce 1 mole of coupling agent capable of being tetrafunctional per 4 mole of catalyst introduced in total into the polymerization medium.

The polymerization stages are preferably carried out in the presence of an organic solvent, the concentration of which in the polymerization medium is between 10 and 40% by weight.

The solvent is preferably chosen from aromatic hydrocarbons such as benzene, toluene, xylene or ethylbenzene, the latter being particularly preferred.

Any presence of air or moisture in the polymerization medium must be avoided so as to protect the efficiency of the catalyst.

The polymerization stages can be carried out between 0 and 120° C. and preferably between 30 and 95° C. The conjugated dienes which can be used are those containing from 4 to 8 carbon atoms, such as 1,3-butadiene, isoprene, 2,3-dimethyl-1,3-butadiene, piperylene, and their mixtures. The preferred conjugated diene is 1,3-butadiene.

Vinylaromatic monomer is understood to mean styrene as well as the styrene derivatives having a copolymerization behavior similar to that of styrene, such as styrene substituted by an alkyl group, in particular on the ring, for instance methylstyrenes, ethylstyrenes or tert-butylstyrenes. Styrene is the preferred vinylaromatic monomer.

In the examples, the expressions "dry styrene", "dry butadiene" or "dry ethylbenzene" respectively denote styrene, butadiene, or ethylbenzene freshly degassed by a stream of nitrogen and dried over 0.3 rim (or 3A) molecular sieve, so that these products contain less than 10 ppm of water.

In the examples, the properties of the star block copolymers, which are pure or in a mixture with polystyrene, were determined by the following techniques:

Melt index: ASTM Standard D 1238

Polybutadiene level in the star block copolymer (in the homopolymer block or copolymer block form): proton nuclear magnetic resonance Styrene level in the butadiene/styrene copolymer block ($B_1/S_3$) :proton nuclear magnetic resonance 1 kg Vicat softening point: ASTM Standard D 1525

Impact strength: AFNOR Standard NST 51-118/85

Elongation at break: ASTM Standard D638

Flexural modulus: ASTM Standard D790

Yellowing index: ASTM Standard D1925

Transparency: the haze indices were determined using the device marketed by the company Hunterlab under the trademark COLORQUEST.

In Table 1, the expression $S_3/(S_3+B_1)$ represents the percentage by weight of units resulting from the styrene contained in the copolymer blocks ($B_1/S_3$).

The examples were carried out at a substantially identical polybutadiene level but by varying the relative amount of butadiene in the blocks ($B_1/S_3$) and $B_2$.

EXAMPLE 1
(Comparative)

A 25 litre, double-jacketed, stainless steel reactor equipped with a double-ribbon stirrer and with temperature regulation is passivated under a nitrogen atmosphere by 8 kg of a $10^{-2}$ Mole per litre solution of n-butyllithium in ethylbenzene. After emptying, this reactor is charged, still under a nitrogen atmosphere, at room temperature and with stirring, with 3000 grams of dry ethylbenzene and then with 24.4 ml of a 1.6 mole per litre solution of n-butyllithium in hexane (i.e. 2.5 g of n-butyllithium).

Water at 25° C. is run through the double jacket of the reactor and then 250 grams of dry styrene are charged into this reactor over approximately 5 minutes. It is observed, during this operation, that the temperature inside the reactor rises to approximately 35° C. The mixture is left stirring for approximately 15 minutes following which 2480 grams of dry styrene are introduced at a steady flow rate over approximately 50 minutes. The temperature then rises to 70° C. and this temperature is maintained. At this stage, a first polystyrene block $S_1$ has been created. 97.6 ml of the n-butyllithium solution in hexane which has already been described (i.e. 10 g of n-butyllithium) and then 1890 grams of dry styrene, in a steady flow rate over approximately 35 minutes, are then added, still with stirring and at 70° C. At this stage, a second polystyrene block $S_2$, partly bonded to the first block $S_1$, has been created. A mixture consisting of 630 grams of dry styrene and 55 grams of dry 1,3-butadiene is then introduced at a steady flow rate over approximately 15 minutes, still with stirring. The temperature is allowed to rise from 70 to 90° C. At this stage, a statistical copolymer ($B_1/S_3$) of styrene and of 1, 3-butadiene, one part being bonded to $S_2$ and the other part being bonded to $S_1$-$S_2$, has been created. 1695 grams of dry butadiene are then added at a steady flow rate over approximately 30 minutes, the temperature still being maintained at 90° C. At this stage, $B_2$-($B_1/S_3$)-$S_2$ and $B_2$-($B_1/S_3$)-$S_2$-$S_1$units have been created. 28 grams of decyl adipate, marketed under the tradename GARBEXOL A10 by the company Great Lakes Chemicals, are then added as coupling agent and the mixture is left stirring for approximately 30 minutes, the temperature staying maintained at 90° C. A pressure of 3 bar of carbon dioxide gas is then applied for 30 minutes. The pressure is brought back to atmospheric pressure and 3.5 grams of water are introduced and then, after approximately 15 minutes, a mixture of anti-oxidizing agents consisting of 17.5 g of octadecyl 3-(3,5-di-tert-butyl- 4-hydroxyphenyl)propionate, marketed under the tradename IRGANOX 1076, 10.5 grams of the 2-(1,1-dimethylethyl)-6-[[3-(1,1-dimethylethyl)-2-hydroxy-5-methylphenyl]methyl]-4-methytphenyl ester of 2-propenoic acid, marketed under the trade name Irganox 3052, and 70 grams of trinonylphenyl phosphite, marketed under the trade name STAVINOR TNPA, is introduced, the first two anti-oxidizing agents being marketed by the company CIBA and the third being marketed by the company CECA.

The solvent of the solution is then evaporated in a single flash stage in a conventional system consisting of a tubular preheater fitted into an evaporation chamber. This operation is carried out at 215° C. at a pressure of 700 millibar, the residence time being approximately 20 minutes. The star block copolymer thus obtained has a structure in accordance with the general formula $[S_1\text{-}S_2\text{-}(B_1/S_3)\text{-}B_2]_m\text{-}X\text{-}[B_2\text{-}(B_1/S_3)\text{-}S_2]_n$.

This star block copolymer has a weight-average molecular mass of 165,000, a number-average molecular mass of 82,000, and a polymolecularity of 2.

This copolymer is then conventionally granulated and test pieces are produced by injection from these granules in order for mechanical and optical tests to be carried out.

A mixture of this copolymer with crystal polystyrene of trade mark LACQRENE 1340, marketed by the company Elf Atochem S. A., is then prepared. This crystal polystyrene has a melt index of 4 and a 1 kg Vicat softening point of 97°

C. Granules of the crystal polystyrene and of the copolymer are homogenized in proportions by mass of 30% and 70% respectively and then test pieces are prepared under the conventional conditions for conversion of polystyrene at around 220° C.

The results are combined in Table 1.

EXAMPLE 2

The reaction is carried out as for Example 1 except that the mixture of styrene and of butadiene now consists of 630 grams of dry styrene and 210 grams of dry butadiene in place of the 55 g of Example 1 and except that 1540 g of dry butadiene are introduced in place of the 1695 g of Example 1 just before introduction of the coupling agent. The results are combined in Table 1. The star block copolymer has a weight-average molecular mass, a number-average molecular mass and a polymolecularity similar to those obtained in Example 1.

EXAMPLE 3

The reaction is carried out as for Example 1 except that the mixture of styrene and butadiene now consists of 630 grams of dry styrene and 324 grams of dry butadiene in place of the 55 g of Example 1 and except that 1426 g of dry butadiene are introduced in place of the 1695 g of Example 1 just before introduction of the coupling agent. The results are combined in Table 1. The star block copolymer has a weight-average molecular mass, a number-average molecular mass and a polymolecularity similar to those obtained in Example 1.

EXAMPLE 4

The reaction is carried out as for Example 1 except that the mixture of styrene and butadiene now consists of 630 grams of dry styrene and 625 grams of dry butadiene in place of the 55 g of Example 1 and except that 1120 g of dry butadiene are introduced in place of the 1695 g of Example 1 just before introduction of the coupling agent. The results are combined in Table 1. The star block copolymer has a weight-average molecular mass, a number-average molecular mass and a polymolecularity similar to those obtained in Example 1.

EXAMPLE 5

The reaction is carried out as for Example 1 except that the mixture of styrene and butadiene now consists of 630 grams of dry styrene and 945 grams of dry butadiene in place of the 55 g of Example I and except that 805 g of dry butadiene are introduced in place of the 1695 g of Example 1 just before introduction of the coupling agent. The results are combined in Table 1. The star block copolymer has a weight-average molecular mass, a number-average molecular mass and a polymolecularity similar to those obtained in Example 1.

EXAMPLE 6

(Comparative)

The reaction is carried out as for Example 1 except that the mixture of styrene and butadiene now consists of 630 grams of dry styrene and 1620 grams of dry butadiene in place of the 55 g of Example 1 and except that 130 g of dry butadiene are introduced in place of the 1695 g of Example 1 just before introduction of the coupling agent. The results are combined in Table 1. The star block copolymer has a weight-average molecular mass, a number-average molecular mass and a polymolecularity similar to those obtained in Example 1.

TABLE 1

| | | UNITS | EXAMPLE 1 (Comparative) | EXAMPLE 2 | EXAMPLE 3 | EXAMPLE 4 | EXAMPLE 5 | EXAMPLE 6 |
|---|---|---|---|---|---|---|---|---|
| Star block copolymer | Polybutadiene level | Weight % | 23.5 | 23.8 | 23 | 24 | 23.5 | 24.1 |
| | $S_3/(S_3 + B_1)$ | Weight % | 92 | 75 | 66 | 50.2 | 40 | 28 |
| | % of the total polybutadiene in $B_2$ | Weight % | 96.9 | 88 | 81.5 | 64 | 46 | 7.4 |
| | Melt index | g/10 min. | 9.1 | 8.7 | 7 | 8.2 | 8 | 7.8 |
| | Transparency (Haze) | | 1.5 | 1.9 | 1.7 | 2.1 | 2.5 | 3 |
| Mixture containing 70% by weight of copolymer/30% by weight of crystal polystyrene | 1 kg Vicat softening point | °C. | 91 | 87.5 | 85 | 84.2 | 83.5 | 81.4 |
| | Impact strength | Joules | 10 | 21 | 24 | 25 | 30 | 27 |
| | Elongation at break | % | 120 | 210 | 273 | 254 | 250 | 240 |
| | Flexural modulus | MPa | 1520 | 1410 | 1360 | 1250 | 1210 | 1123 |
| | Yellowing index | | 2 | 2 | 2.2 | 2 | 2.1 | 2.5 |
| | Transparency (Haze) | | 2 | 3 | 4 | 3 | 7 | 12 |

What is claimed is:

1. A composition comprising crystalline polystyrene and a star block copolymer of the formula $[S_1-S_2-(B_1/S_3)-B_2]_m-X-(B_2-(B_1/S_3)-S_2]_n$ in which X represents the polyfunctional residue of a coupling agent, m and n represent non-zero integers such that m+n is equal to 3 or 4 and is also equal to the degree of functionality of the radical X, $S_1$ and $S_2$ each represent a block of a polymer containing at least one vinylaromatic monomer, $B_2$ represents a block of a polymer containing at least one conjugated diene, $(B_1/S_3)$ represents a block of statistical copolymer containing at least one vinylaromatic monomer and at least one conjugated diene, 40 to 75% by weight of $(B_1/S_3)$ consisting of polymerized vinylaromatic monomer units, wherein the vinylaromatic moieties provide from 60 to 90% by weight of the total mass of the said star block copolymer, the conjugated diene moieties provide from 40 to 10% by weight of the total mass of the said star block copolymer, and the sum of the mass of the blocks $B_2$ contains more than 40% by weight and less than 90% by weight of the total mass of the conjugated diene contained in the said block copolymer.

2. The composition of claim 1, consisting essentially of from 60 to 90% by weight of said star block copolymer and from 40 to 10% by weight of crystalline polystyrene.

3. The composition of claim 1, comprising the star block copolymer wherein 45 to 70% by weight of $(B_1/S_3)$ consists of polymerized vinylaromatic monomer units.

4. The composition of claim 1, comprising the star block copolymer wherein more than 50% by weight and less than 70% by weight of $(B_1/S_3)$ consists of polymerized vinylaromatic monomer units.

5. The composition of claim 1, comprising the star block copolymer wherein the coupling agent is chosen from diesters of formula $R^1OOC-(CH_2)_n-COOR^2$ in which $R^1$ and $R^2$ each represent an alkyl group containing from 8 to 30 carbon atoms and n represents an integer ranging from 1 to 10.

6. The composition of claim 1, comprising the star block copolymer wherein from 20 to 30% of its weight of consists of polymerized conjugated diene units.

7. The composition of claim 1, comprising the star block copolymer wherein the vinylaromatic monomer consists of styrene.

8. The composition of claim 1, comprising the star block copolymer wherein the conjugated diene monomer is 1,3-butadiene.

9. A composition comprising crystalline polystyrene and a star block copolymer of the formula $[S_1-S_2-(B_1/S_3)\ B_2]_m$-$X-[B_2-(B_1/S_3)-S_2]_n$ in which X represents the polyfunctional residue of a coupling agent, m and n represent non-zero integers such that m+n is equal to 3 or 4 and is also equal to the degree of functionality of the radical X, $S_1$ and $S_2$ each represent a block of a polymer containing at least one vinylaromatic monomer, $B_2$ represents a block of a polymer containing at least one conjugated diene, $(B_1/S_3)$ represents a block of a statistical copolymer containing at least one vinylaromatic monomer and at least one conjugated diene, 40 to 75% by weight of $(B_1/S_3)$ consisting of polymerized vinylaromatic monomer units, wherein the vinylaromatic moieties provide from 60 to 90% by weight of the total mass of the said star block copolymer and the sum of the mass of the blocks $B_2$ contains more than 40% by weight and less than 90% by weight of the total mass of the conjugated diene contained in the said star block copolymer.

10. A composition comprising crystalline polystyrene and a star block copolymer of the formula $[S_1-S_2-(B_1/S_3)\ B_2]_m$-$X-[B_2-(B_1/S_3)-S_2]_n$ in which X represents the polyfunctional residue of a coupling agent, m and n represent non-zero integers such that m+n is equal to 3 or 4 and is also equal to the degree of functionality of the radical X, $S_1$ and $S_2$ each represent a block of a polymer containing at least one vinylaromatic monomer, $B_1$ represents a block of a polymer containing at least one conjugated diene, $(B_1/S_3)$ represents a block of a statistical copolymer containing at least one vinylaromatic monomer and at least one conjugated diene, 40 to 75% by weight of $(B_1/S_3)$ consisting of polymerized vinylaromatic monomer units, wherein the conjugated diene moieties provide from 40 to 10% by weight of the total mass of the said star block copolymer and the sum of the mass of the blocks $B_2$ contains more than 40% by weight and less than 90% by weight of the total mass of the conjugated diene contained in the said star block copolymer.

* * * * *